US010817195B2

(12) United States Patent
Schreter

(10) Patent No.: US 10,817,195 B2
(45) Date of Patent: Oct. 27, 2020

(54) KEY-VALUE BASED MESSAGE ORIENTED MIDDLEWARE

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 16/029,449

(22) Filed: Jul. 6, 2018

(65) Prior Publication Data
US 2019/0014188 A1 Jan. 10, 2019

Related U.S. Application Data

(60) Provisional application No. 62/530,075, filed on Jul. 7, 2017.

(51) Int. Cl.
*G06F 15/16* (2006.01)
*G06F 3/06* (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01);
(Continued)

(58) Field of Classification Search
CPC ...... G06F 3/0631; G06F 16/27; G06F 16/162; G06F 16/245; G06F 16/1824; G06F 16/215; G06F 16/24552; G06F 16/176; G06F 16/2358; G06F 16/951; G06F 16/128; G06F 16/134; H04L 67/1097; H04L 67/2809; H04L 67/2842; H04L 69/40
USPC .................................................. 709/203, 206
See application file for complete search history.

(56) References Cited

U.S. PATENT DOCUMENTS

| | | | |
|---|---|---|---|
| 5,878,431 A | 3/1999 | Potterveld et al. | |
| 7,337,214 B2 * | 2/2008 | Douglass | ............ H04L 67/2842 709/214 |

(Continued)

*Primary Examiner* — Thu Ha T Nguyen
(74) *Attorney, Agent, or Firm* — Mintz Levin Cohn Ferris Glovsky and Popeo, P.C.

(57) ABSTRACT

A method for brokering an exchange of data between a backend server, a first client, and a second client is provided. The method can include receiving, from the backend server and/or the first client coupled with the backend server, a message. The response to the receipt of the message can include posting the message to a message queue having a same topic as the message. The message can be posted to the message queue at least by appending the message to a key-value pair corresponding to the message queue. The key-value pair can be stored in the distributed data storage system. The message can be sent to a second client coupled with the backend server based at least on the second client having subscribed to the topic of the message queue. Related systems and articles of manufacture, including computer program products, are also provided.

18 Claims, 6 Drawing Sheets

(51) Int. Cl.

| | | |
|---|---|---|
| *G06F 17/30* | (2006.01) | |
| *G06F 16/11* | (2019.01) | |
| *H04L 29/14* | (2006.01) | |
| *G06F 11/14* | (2006.01) | |
| *H04L 29/08* | (2006.01) | |
| *G06F 16/2455* | (2019.01) | |
| *G06F 12/0802* | (2016.01) | |
| *G06F 16/16* | (2019.01) | |
| *G06F 16/182* | (2019.01) | |
| *G06F 16/176* | (2019.01) | |
| *G06F 16/13* | (2019.01) | |
| *G06F 12/1009* | (2016.01) | |
| *G06F 16/951* | (2019.01) | |
| *G06F 16/27* | (2019.01) | |
| *G06F 16/23* | (2019.01) | |
| *G06F 11/16* | (2006.01) | |
| *G06F 16/245* | (2019.01) | |
| *G06F 16/215* | (2019.01) | |

(52) U.S. Cl.
CPC ........ *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *G06F 17/30088* (2013.01); *H04L 67/1097* (2013.01); *H04L 67/2809* (2013.01); *H04L 67/2842* (2013.01); *H04L 69/40* (2013.01); *G06F 2201/84* (2013.01); *G06F 2201/85* (2013.01); *G06F 2212/604* (2013.01); *G06F 2212/652* (2013.01)

(56) References Cited

U.S. PATENT DOCUMENTS

| | | | |
|---|---|---|---|
| 7,849,223 B2 | 12/2010 | Malkhi et al. | |
| 8,627,422 B2* | 1/2014 | Hawkes | H04L 63/166 726/5 |
| 9,087,020 B1* | 7/2015 | Amacker | G06F 16/958 |
| 9,622,204 B2* | 4/2017 | Lindheimer | H04W 48/08 |
| 10,298,640 B1* | 5/2019 | Luke | H04L 65/4084 |
| 10,489,387 B1* | 11/2019 | Rogynskyy | H04L 51/046 |
| 2004/0088413 A1* | 5/2004 | Bhogi | G06F 9/5061 709/226 |
| 2006/0045111 A1 | 3/2006 | Sinha | |
| 2006/0053376 A1* | 3/2006 | Ng | G06F 16/954 715/742 |
| 2006/0218228 A1* | 9/2006 | Mouline | G06Q 30/06 709/203 |
| 2006/0271705 A1 | 11/2006 | Garcia-Luna-Aceves | |
| 2007/0083675 A1* | 4/2007 | Vemulapelli | H04L 51/36 709/246 |
| 2008/0228872 A1* | 9/2008 | Bock | H04L 29/06 709/203 |
| 2009/0150566 A1 | 6/2009 | Malkhi et al. | |
| 2009/0216936 A1 | 8/2009 | Chu | |
| 2009/0287975 A1 | 11/2009 | Kim | |
| 2010/0002506 A1 | 1/2010 | Cho | |
| 2010/0027351 A1 | 2/2010 | Seol | |
| 2010/0293140 A1 | 11/2010 | Nishiyama | |
| 2011/0197023 A1 | 8/2011 | Iwamitsu | |
| 2012/0246190 A1 | 9/2012 | Surtani | |
| 2013/0080348 A1* | 3/2013 | Pantaliano | G06Q 30/02 705/347 |
| 2013/0275656 A1 | 10/2013 | Talagala | |
| 2013/0275818 A1 | 10/2013 | Okubo | |
| 2014/0012891 A1* | 1/2014 | Wong | G07F 17/3293 709/203 |
| 2014/0059290 A1 | 2/2014 | Ross | |
| 2014/0215179 A1 | 7/2014 | Matsuhira | |
| 2014/0279920 A1 | 9/2014 | Madhavarapu | |
| 2014/0289358 A1 | 9/2014 | Lindamood et al. | |
| 2014/0304409 A1* | 10/2014 | Kamath | H04L 67/1036 709/225 |
| 2015/0058291 A1 | 2/2015 | Earl | |
| 2015/0089185 A1* | 3/2015 | Brandyberry | G06F 11/2058 711/207 |
| 2015/0310401 A1* | 10/2015 | Siracusa | G06F 11/3495 705/39 |
| 2016/0026672 A1 | 1/2016 | Zhang | |
| 2016/0098876 A1* | 4/2016 | Oz | H04W 4/023 340/5.61 |
| 2016/0105471 A1 | 4/2016 | Nunes et al. | |
| 2016/0261395 A1* | 9/2016 | Agarwal | H04L 67/42 |
| 2016/0308968 A1 | 10/2016 | Friedman | |
| 2016/0374118 A1* | 12/2016 | Mestanov | H04W 8/005 |
| 2017/0134276 A1 | 5/2017 | White | |
| 2017/0134947 A1* | 5/2017 | Nilsson | H04W 12/06 |
| 2017/0230451 A1* | 8/2017 | Paramasivam | H04L 67/22 |
| 2017/0295061 A1 | 10/2017 | Wittenschlaeger | |
| 2018/0227752 A1* | 8/2018 | Teyeb | H04W 92/02 |
| 2019/0102409 A1* | 4/2019 | Shi | G06F 16/27 |
| 2019/0171762 A1* | 6/2019 | Luke | G06F 16/68 |
| 2019/0205993 A1* | 7/2019 | Rodriguez | G06N 3/08 |
| 2019/0262719 A1* | 8/2019 | Wang | A63F 13/352 |
| 2019/0268308 A1* | 8/2019 | Sinha | H04L 63/0281 |
| 2020/0034353 A1* | 1/2020 | Innocenti | G06Q 20/223 |
| 2020/0065300 A1* | 2/2020 | Yang | G06F 16/2379 |
| 2020/0142788 A1* | 5/2020 | Hu | G06F 9/5083 |

* cited by examiner

KEY-VALUE BASED MESSAGE ORIENTED MIDDLEWARE

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to a key-value based message oriented middleware.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for brokering an exchange data between a backend server, a first client, and a second client. In one aspect, there is provided a system. The system may include at least one data processor and at least one memory. The at least one memory may store instructions that result in operations when executed by the at least one data processor. The operations can include: receiving, from a backend server and/or a first client coupled with the backend server, a message; responding to the receipt of the message by at least posting the message to a first message queue having a same topic as the message, the message being posted to the first message queue at least by appending the message to a key-value pair corresponding to the first message queue, and the key-value pair stored in the distributed data storage system; and sending, to a second client coupled with the backend server, the message from the first message queue based at least on the second client having subscribed to the topic of the first message queue.

In some variations, one or more features disclosed herein including the following features can optionally be included in any feasible combination. The message can be sent to the second client by a connection handler coupled with the backend server, the first client, and/or the second client. The connection handler can be configured to push the message from the first message queue to the second client.

In some variations, the key-value pair can include a key corresponding to the topic of the first message queue. The key-value pair can be retrieved from the distributed data storage system based at least on the key of the key-value pair matching a topic of the message.

In some variations, the message can be posted to the first message queue by at least appending the message to a value comprising the key-value pair.

In some variations, the first message queue can be stored in a first data partition within the distributed data storage system. The first data partition can be stored at a first computing node comprising the distributed data storage system. A replica of the first data partition can be stored at a second computing node comprising the distributed data storage system. The key-value pair can be stored in a key-value store. The key-value store can be stored at the first computing node. A replica of the key-value store can be stored at the second computing node. The key-value store can be a hybrid key-value store that includes an in-memory key-value store and a secondary data store. The first message queue can be stored as a data record in the hybrid key-value store. The data record can be stored in the in-memory key-value store based at least on the data record not exceeding a threshold size. The data record can be stored in the secondary data store based at least on the data record exceeding the threshold size.

In some variations, the first message queue can be stored as the key-value pair based at least on fewer than a threshold quantity of messages being posted to the first message queue. A second message queue can be stored as a log and/or a plurality of key-value pairs that each correspond to a message posted to the second message queue based at least on greater than the threshold quantity of messages being posted to the second message queue.

In some variations, the backend server, the first client, and/or the second client comprises an Internet-of-Things (IoT) system. The backend server can be configured to coordinate an operation of the first client and/or the second client.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
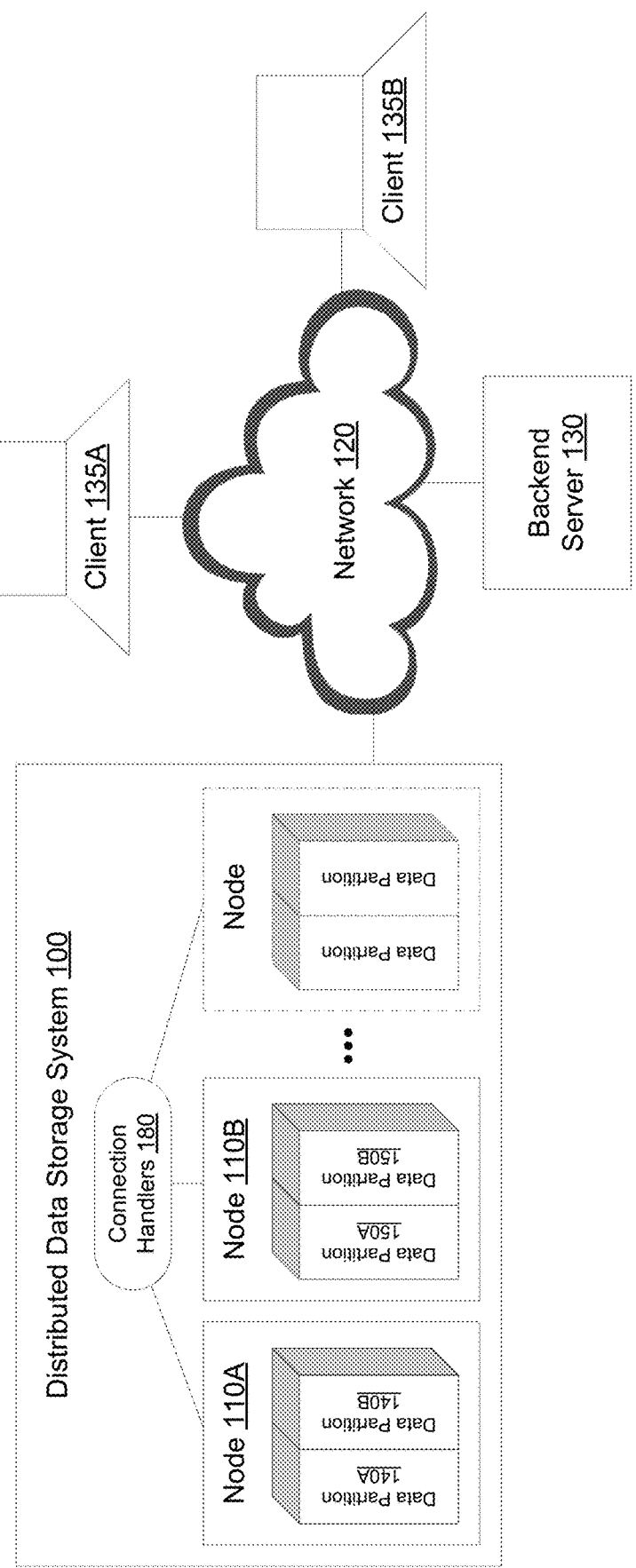
FIG. 1 depicts a system diagram illustrating a distributed data storage system consistent with some implementations of the current subject matter.

The Internet-of-Things (IoT) can be a network of interconnected devices including, for example, smartphones, computers, automobiles, home appliances, and/or the like. These devices can be embedded with connectivity to enable the exchange of data via any wired and/or wireless networks including, for example, the Internet, a local area network (LAN), a virtual local area network (VLAN), a wide area network (WAN), a public land mobile network (PLMN), and/or the like). But the Internet-of-Things can give rise to an immense volume of data, which must be routed between devices producing the data and devices consuming the data. As such, in some implementations of the current subject matter, a distributed data storage system can serve as a message oriented middleware (MOM), which may use one or more message queues for routing data between a central, backend server and a plurality of Internet-of-Things devices.

In some implementations of the current subject matter, the distributed data storage system can include multiple computing nodes for storing a plurality of data partitions, each of which holding the one or more message queues used for routing data between the backend server and the plurality of devices. These data partition can be replicated across different computing nodes within the distributed data storage system, thereby increasing the fault tolerance of the message oriented middleware. According to some implementations of the current subject matter, the routing of data between the backend server and the plurality of devices can be performed based on the topic of the messages being exchanged. Furthermore, a subscription to a topic can be required in order to receive messages associated with that topic. For instance, the backend server can receive, from one or more devices, messages under a particular topic when the one or more devices post the messages to a message queue associated with that topic. Alternatively and/or additionally, the backend server can send messages to the one or more devices by at least posting the messages to the respective message queues of each of the one or more devices.

In some implementations of the current subject matter, the distributed data storage system can include one or more key-value stores for storing at least some of the message queues for routing data between the backend server and the plurality of devices. For instance, the key-value stores can store the message queues associated with different topics. The topic of a message queue may be of interest to an individual device if that device subscribes to that topic. As such, these message queues can be low traffic because relatively few messages tend to be posted to message queues having topics that are specific to individual devices. According to some implementations of the current subject matter, a low traffic message queue can be stored as a key-value pair (KVP) in a key-value store, which can also be replicated across different computing nodes within the distributed data storage system. The key associated with the key-value pair can correspond to the topic of the message queue whereas the value associated with the key-value pair can correspond to one or more messages posted to the message queue. It should be appreciated that one or more connection handlers can broker the exchange of data between the backend server and different devices by at least posting messages to different message queues in accordance with the respective topics of the messages and of the message queues.

In some implementations of the current subject matter, a message queue can be stored as key-value pairs in any type of key-value stores. For example, the message queue can be stored as a key-value pair in a hybrid key-value store. The hybrid key-value store can include an in-memory key-value store for storing data records that do not exceed a threshold size (e.g., 2 kilobytes and/or a different size) and a secondary data store for storing data records that exceeds the threshold size. As such, the message queue can be stored as a plurality of data records in the hybrid key-value store. This plurality of data records can include a first data record that do not exceed the threshold size and is therefore stored in the in-memory key-value store. The first data record can hold the key associated with the key-value pair, a portion of the value associated with the key-value pair, and/or references (e.g., pointers, page list, and/or the like) to the remaining portions of the value associated with the key-value pair. Alternatively and/or additionally, this plurality of data records can include a second data record can be stored in the secondary data store if the second data record does exceed the threshold size. The second data record can include at least some of the remaining portions of the value associated with the key-value pair. It should be appreciated that at least some of the message in the message queue can be stored, in the in-memory key-value store, as part of the first data record. Meanwhile, the second data record can be used for spooling any additional message in the message queue.

In some implementations of the current subject matter, appending and/or removing a message from a message queue, for example, in order to post and/or receive the message, can require retrieving the corresponding key-value pair. Where the corresponding key-value pair is stored in a hybrid key-value store, retrieving that key-value pair can include retrieving the first data record from the in-memory key-value store. According to some implementations of the current subject matter, the message can be appended to and/or removed from the portion of the value of the key-value pair included in the first data record. As noted, the second data record can be used for spooling additional messages in the message queue. Thus, appending and/or removing the message from the message queue can further include retrieving the second data record from the secondary data store such that the message can be appended to and/or removed from the portion of the value of the key-value pair included in the second data record.

FIG. 1 depicts a system diagram illustrating a distributed data storage system 100 consistent with implementations of the current subject matter. Referring to FIG. 1, the distributed data storage system 100 can include a plurality of computing nodes including, for example, a first computing node 110A and a second computing node 110B. Furthermore, as shown in FIG. 1, the distributed data storage system 100 can be communicatively coupled, via a network 120, with a plurality of clients including, for example, a backend server 130, a first client 135A and a second client 135B.

In some implementations of the current subject matter, the first client 135A and/or the second client 135B can be any type of Internet-of-Things (IoT) device configured to exchange data over the network 120 with each other and/or with the backend server 130. For instance, the first client 135A and/or the second client 135B can be smartphones, computers, automobiles, home appliances, and/or the like. Meanwhile, the backend server 130 can be configured to coordinate and/or control the operations of the first client 135A and/or the second client 135B including by, for example, sending commands triggering one or more actions at the first client 135A and/or the second client 135B. It should be appreciated that the network 120 can be any wired and/or wireless network including, for example, a public land mobile network (PLMN), a local area network (LAN), a virtual local area network (VLAN), a wide area network (WLAN), the Internet, and/or the like.

In some implementations of the current subject matter, the distributed data storage system 100 can be configured to serve as message oriented middleware (MOM) for routing data between the backend server 130, the first client 135A, and the second client 135B. For example, the distributed data storage system 100 can be configured to store message queues for the backend server 130, the first client 135A, and/or the second client 135B. As noted, the message queues for the backend server 130, the first client 135A, and/or the second client 135B can each be associated with a topic. Furthermore, the routing of data between the backend server 130, the first client 135A, and/or the second client 135B can be performed based on the topic of the messages being exchanged. For instance, the topic of a message queue can be "temperature," in which case the first client 135A and/or the second client 135B can post, to the message queue, messages containing data such as, for example, a timestamp, a device identifier, a location, a temperature measurement, and/or the like. Alternatively and/or additionally, the topic of the message queue can be "remote commands," in which case the backend server 130 can post, to the message queue, messages that commands the first client 135A and/or the second client 135B to perform certain actions such as, for example, update firmware, unlock door, and/or the like. It should be appreciated that multiple message queues may exist for holding commands from the backend server 130. For example, there may be one message queue for commands from the backend server 130 to the first client 135A and a different message queue for commands from the backend server 130 to the second client 135B.

In some implementations of the current subject matter, the distributed data storage system 110 can be configured to store the inbound message queues for the backend server 130, the first client 135A, and/or the second client 135B in separate data partitions at one or more of the plurality of computing nodes. Moreover, the distributed data storage system 110 can store replicas of the message queues for the backend server 130, the first client 135A, and/or the second client 135B across different computing nodes. It should be appreciated that the message queues for the backend server 130, the first client 135A, and/or the second client 135B can be implemented as message logs. As such, to deliver incoming messages to the backend server 130, the first client 135A, and/or the second client 135B, one or more connection handlers 180 at the distributed data storage system 100 can post, based on the topic of the incoming messages, the incoming messages into the corresponding messages logs.

To further illustrate, FIG. 1 shows that each of the plurality of computing nodes at the distributed data storage system 100 can include one or more data partitions, each of which holding a message queue and/or a replica of a message queue for a client of the distributed data storage system 100. For example, the first computing node 110A can include a first data partition 140A and a second data partition 140B. The first data partition 140A can hold the message queue for the backend server 130 while the second data partition 140B can hold the message queues for the first client 135A and/or the second client 135B.

Furthermore, the first data partition 140A and/or the second data partition 140B can be replicated and stored as a third data partition 150A and/or a fourth data partition 150B at the second computing node 110B. As such, replicas of the message queues for the backend server 130, the first client 135A, and/or the second client 135B can be stored in at the second computing node 110B, for example, in the third data partition 150A and/or the fourth data partition 150B. It should be appreciated that replicating the message queues for the backend server 130, the first client 135A, and/or the second client 135B can increase the fault tolerance of the distributed data storage system. Furthermore, the distributed data storage system 100 can maintain consistency across the replicas of data partitions stored across different computing nodes at least by applying a consensus protocol such as, for example, the consensus protocol described in U.S. patent application Ser. No. 15/363,738.

In some implementations of the current subject matter, the distributed data storage system 100 can store a message queue as a key-value pair (KVP) in a key-value store. For instance, low traffic message queues such as, for example, the message queues associated with topics that are of interest individual clients such as the first client 135A and/or the second client 135B, tend to receive relatively few messages and can therefore be stored as key-value pairs in a key-value store. The key associated with such a key-value pair can correspond to the topic of a message queue. Meanwhile, the value associated with the key-value pair can correspond to one or more messages posted to the message queue. It should be appreciated that the distributed data storage system 100 can store high traffic message queues such as, for example, the message queues associated with the backend server 130, which tend to receive a large quantity of messages, as logs. Alternatively and/or additionally, high traffic message queues can also be stored as key-value pairs in which each message is stored as a separate key-value pair.

Figure 2:
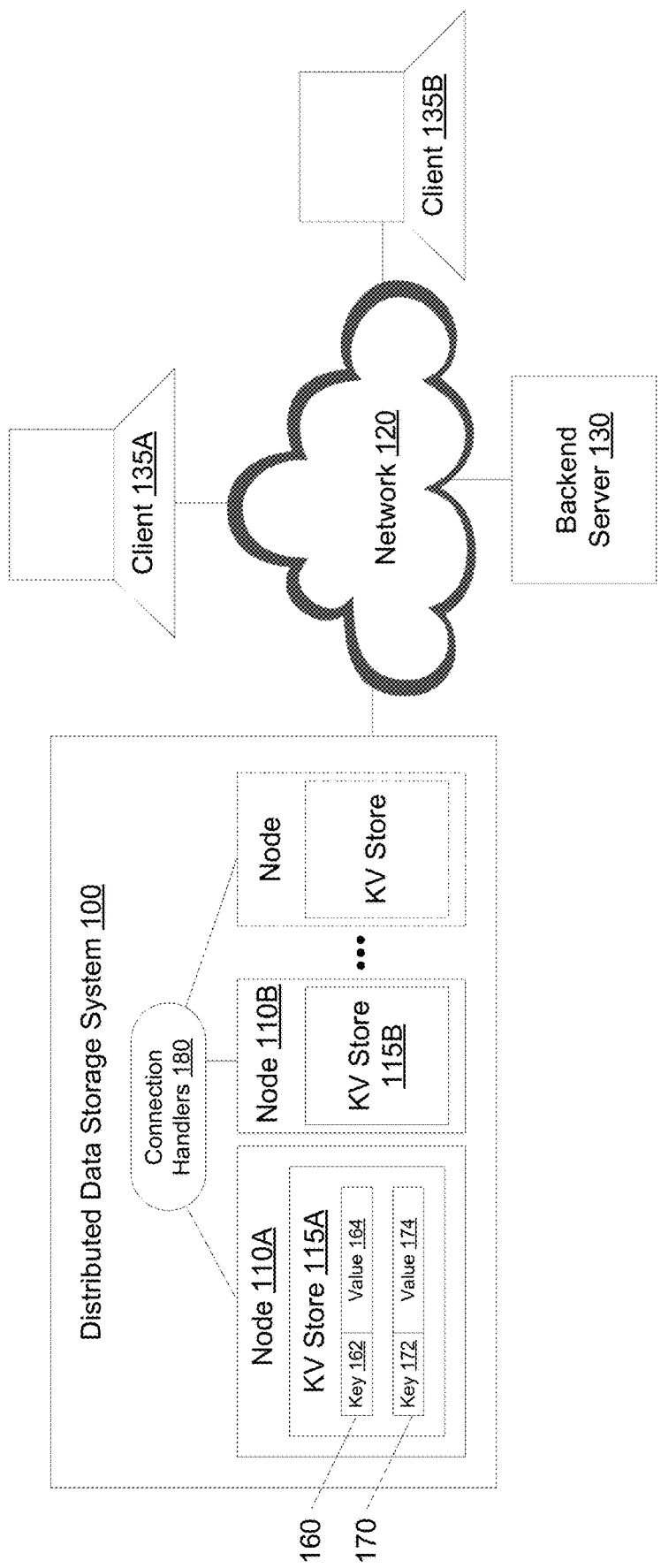
FIG. 2 depicts a system diagram illustrating a distributed data storage system consistent with some implementations of the current subject matter.

To further illustrate, FIG. 2 depicts a system diagram illustrating the distributed data storage system 100 consistent with some implementations of the current subject matter. As shown in FIG. 2, the first computing node 110A can include a first key-value store 115A while the second computing node 110B can include a second key-value store 115B. It should be appreciated that the first key-value store 110A and/or the second key-value store 110B can be any type of key-value stores including, for example, hybrid key-value stores. Furthermore, the second key-value store 115B can be a replica of the first key-value store 115A, thereby creating a redundant set of the message queues stored as key-value pairs in the first key-value store 115A. This redundancy can increase the fault tolerance of the distributed data storage system 100. Moreover, it should be appreciated that consistency across the replicas of key-value stores at different computing nodes in the distributed data storage system 100 can be maintained at least by applying a consensus protocol such as, for example, the consensus protocol described in U.S. patent application Ser. No. 15/363,738.

Referring again to FIG. 2, the first key-value store 115A can store a plurality of key-value pairs (KVPs) including, for example, a first key-value pair 160 and a second key-value pair 170. The first key-value pair 160 can correspond to a message queue having a topic that is of interest to the first client 135A. For instance, the first client 135A can subscribe to the topic associated with that message queue in order to receive messages posted to the message queue. Accordingly, a first key 162 of the first key-value pair 160 can correspond to the topic of the message queue while a first value 164 of the first key-value pair 160 can correspond to one or more messages posted to the message queue. Alternatively and/or additionally, the second key-value pair 170 can correspond to a message queue having a topic that is of interest to the second client 135B. As such, a second key 172 of the second key-value pair 170 can correspond to the topic of that message queue while a second value 174 of the second key-value pair 170 can correspond to one or more messages posted to the message queue. It should be appreciated that the backend server 130 can route a message based on the topic of the message. Thus, a message, for example, from the backend server 130, to the first client 135A, and/or to the second client 135B, can be posted to a message queue having a topic to which the respective client has subscribed. For example, the topic may be an identifier of the first client 135A and/or the second client 135B.

In some implementations of the current subject matter, messages for a client can be posted to and/or read from the message queue of the client by at least appending and/or removing the message from a value of the key-value pair corresponding to the message queue. For example, the one or more connection handlers 180 can broker an exchange of data between the backend server 130, the first client 135A, and/or the second client 135B by at least posting messages to the respective message queues of the backend server 130, the first client 135A, and/or the second client 135B. A message to the first client 135A, for example, can be posted to the message queue of the first client 135A by at least appending the message to the first value 164 of the first key-value pair 160. Alternatively and/or additionally, a message to the second client 135B can be posted to the message queue of the second client 135B by at least appending the message to the second value 174 of the second key-value pair 170. It should be appreciated that the one or more connection handlers 180 can broker the exchange of data between the backend server 130, the first client 135A, and/or the second client 135B using any messaging protocol including, for example, message queuing telemetry transport (MQTT), advanced message queuing protocol (AMQP), and/or the like.

According to some implementations of the current subject matter, the one or more connection handlers 180 can route data between the backend server 130, the first client 135A, and/or the second client 135B based on the topic of messages being exchanged. Furthermore, as noted, to receive a message under a topic can require a subscription to that topic. To further illustrate, the first client 135A can subscribe to a topic by at least subscribing to that topic. Based on the subscription to the topic, the one or more connection handlers 180 can post, to the message queue of the first client 135A, messages associated with the topic, which can be output by the backend server 130 and/or the second client 135B. As noted, the one or more connection handler 180 can post the messages to the message queue of the first client 135A by at least appending the messages to the first value 164 of the first key-value pair 160 corresponding to the message queue of the first client 135A.

Figure 3:
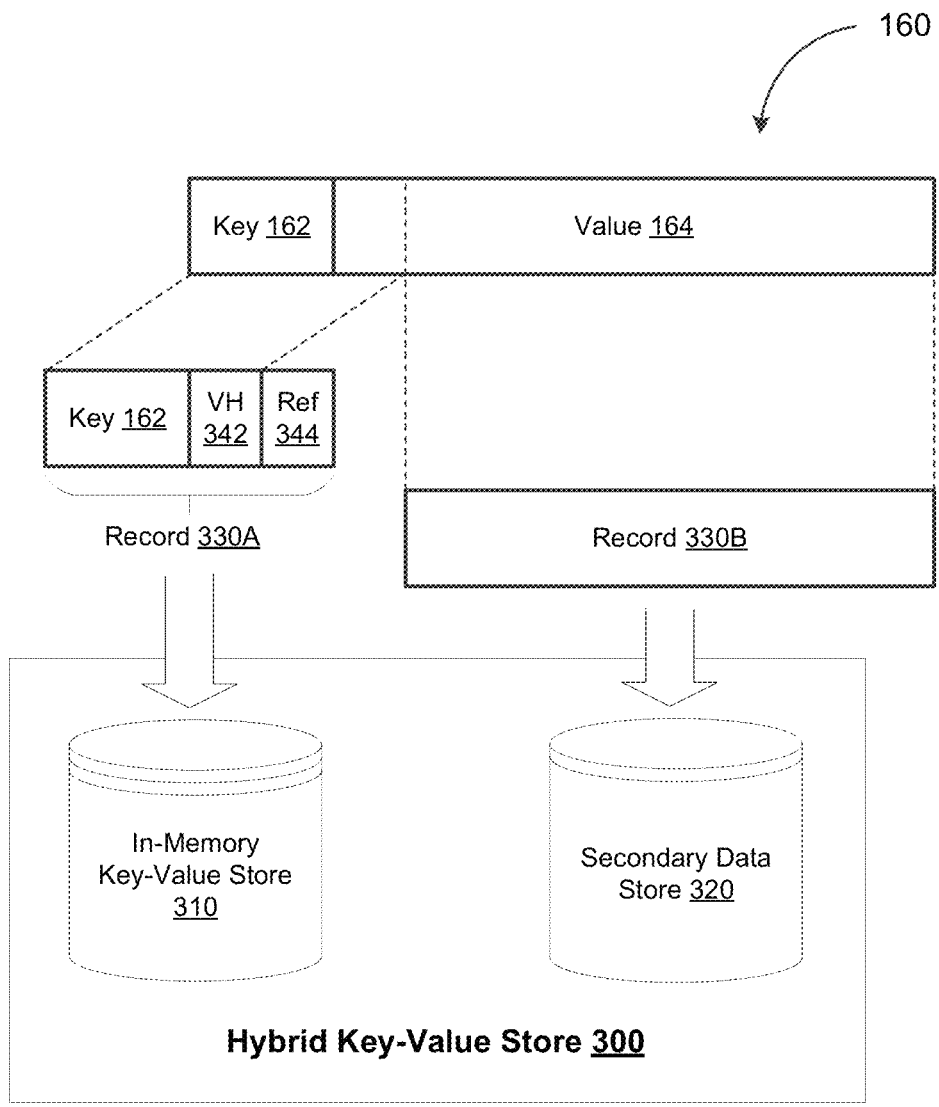
FIG. 3 depicts a block diagram illustrating a hybrid key-value store consistent with some implementations of the current subject matter.

As noted, in some implementations of the current subject matter, the distributed data storage system 100 can store a message queue as a key-value pair in a key-value store such as, for example, a hybrid key-value store. For example, low traffic message queues that receive relatively few messages such as, for example, the respective message queues for the first client 135A and the second client 135B, can be stored as key-value pairs in a hybrid key-value store. To further illustrate, FIG. 3 depicts a block diagram illustrating a hybrid key-value store 300 consistent with some implementations of the current subject matter. Referring to FIGS. 2-3, the hybrid key-value store 300 can implement one or more of the plurality of key-value stores at the distributed data storage system 100 including, for example, the first key-value store 115A, the second key-value store 115B, and/or the like.

As shown in FIG. 3, the hybrid key-value store 300 can include an in-memory key-value store 310 and a secondary data store 320. In some implementations of the current subject matter, the in-memory key-value store 310 can be configured to store data records that do not exceed a threshold size (e.g., 2 kilobytes and/or a different size) and the secondary data store 320 can be configured to store data records that do exceed the threshold size (e.g., 2 kilobytes and/or a different size). It should be appreciated that the in-memory key-value store 310 can be implemented using any type of persistence that supports low latency access including, for example, random access memory (RAM) and/or the like. Meanwhile, the secondary data store 320 can be implemented using any type of persistence that supports high capacity storage including, for example, hard disk and/or the like.

According to some implementations of the current subject matter, the hybrid key-value store 310 can be configured to store a plurality of key-value pairs. As noted, each of this plurality of key-value pairs can correspond a message queue, such as, for example, a low traffic message queue that receives relatively few messages. For example, as shown in FIG. 3, the hybrid key-value store 310 can store the first key-value pair 160, which can correspond to the message queue of the first client 135A. Furthermore, as shown in FIG. 3, the hybrid key-value store 310 can store the first key-value pair 160 by at least storing a plurality of data records corresponding to the first key-value pair 160 including, for example, a first data record 330A and a second data record 330B.

As noted, the first key-value pair 160 can include the first key 162, which can correspond to a topic of the corresponding message queue. Furthermore, the first key-value pair 160 can include the first value 164, which can correspond to one or more messages posted to the message queue. In some implementations of the current subject matter, the first key 162 can be stored as part of the first record 330A in the in-memory key-value store 310. Meanwhile, at least a portion of the first value 164 can also be stored as part of the first record 330A in the in-memory key-value store 310. Alternatively and/or additionally, a portion of the first value 164 can also be stored as part of the second data record 330B in the secondary data store 320. As such, according to some implementations of the current subject matter, at least some of the messages for the first client 135A can be stored, in the in-memory key-value store 310, as part of the first data record 330A. Meanwhile, the second data record 330A can be used for spooling any additional messages for the first client 135A.

In some implementations of the current subject matter, the one or more connection handlers 180 can broker the exchange of data between the backend server 130, the first client 135A, and the second client 135B by at least posting messages to the respective message queues of the backend server 130, the first client 135A, and/or the second client 135B. For example, to transfer a message from the backend server 130 to the first client 135A, the one or more connection handlers 180 can append the message to the first value 164 of the first key-value pair 160 corresponding to a message queue having a same topic as the message. Meanwhile, the first client 135A can receive that message by at least reading the message, for example, by at least removing the message from the first value 164 of the first key-value pair 160. As noted, to receive a message belonging to a topic can require a subscription to that topic. Accordingly, the one or more connection handlers 180 can post the message from the backend server 130 to the first client 135A based on the first client 135A having subscribed to the topic associated with the message.

In some implementations of the current subject matter, the first key-value pair 160 can be stored in the hybrid key-value store 300. Accordingly, appending and/or removing a message from the message queue corresponding to the first key-value pair 160, for example, in order to post and/or read the message, can include appending and/or removing the message from the first data record 330A or the second data record 320B. In some implementations of the current subject matter, the one or more connection handlers 180 can append a message directly to the first data record 330A if the first data record 330A is able to accommodate the message, for example, as part of a value head 342, without exceeding the threshold size (e.g., 2 kilobytes and/or a different size) for data records stored in the in-memory key-value store 310. Alternatively and/or additionally, if the first data record 330A is unable to accommodate the message without exceeding the threshold size (e.g., 2 kilobytes and/or a different size), the one or more connection handlers 180 can append the message to the second data record 330B instead. According to some implementations of the current subject matter, the second data record 330B can be used for spooling messages that exceed the capacity of the first data record 330A. For instance, the second data record 330B can be used for spooling messages that exceed the capacity of the value head 342.

In some implementations of the current subject matter, appending and/or removing a message from the second data record 330B can require retrieving the second data record 330B from the secondary data store 320. As shown in FIG. 2, the first data record 330A can include a reference 344 (e.g., a pointer, a page list, and/or the like) to the second data record 330B in the secondary data store 320. Accordingly, in order to retrieve the second data record 330B from the secondary data store 320, the one or more connection handlers 180 can retrieve, based on the first key 162, the first data record 330A from the in-memory key-value store 310. Furthermore, the one or more connection handlers 180 can retrieve, based on the reference 344 included in the first data record 330A, the second data record 330B from the secondary data store 320.

Figure 4A:
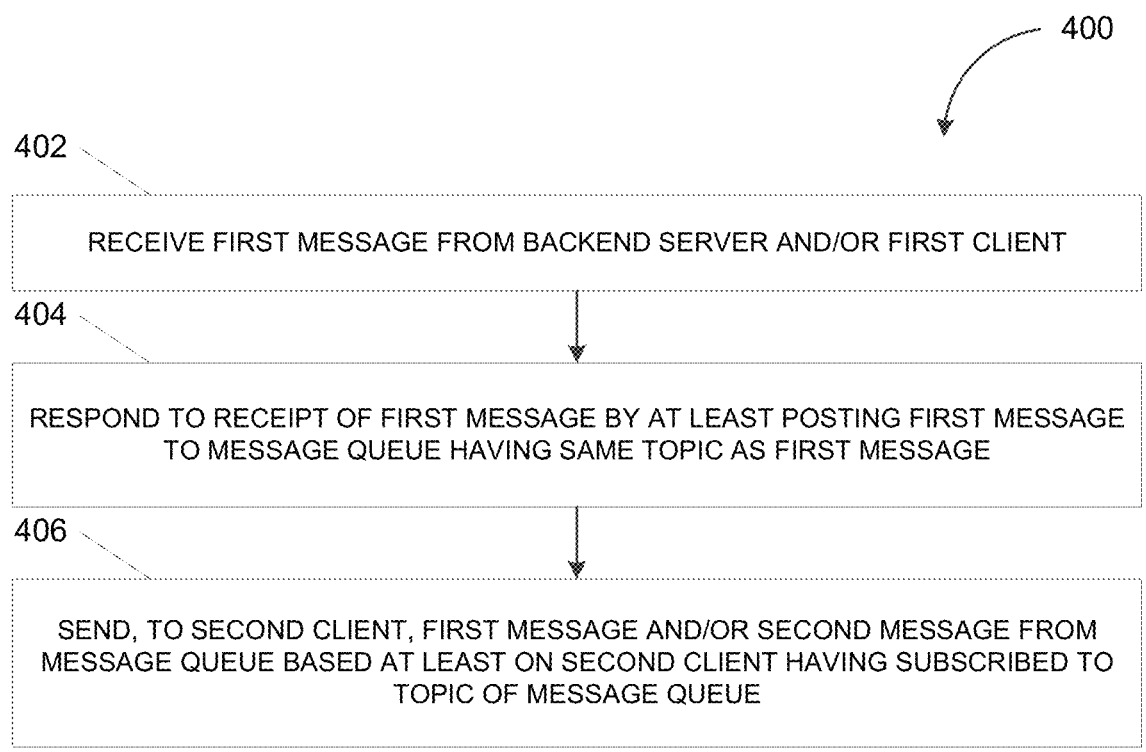
FIG. 4A depicts a flowchart illustrating a process for routing data between a backend server, a first client, and/or a second client consistent with some implementations of the current subject matter.

FIG. 4A depicts a flowchart illustrating a process 400 for transferring a message between the backend server, the first client 135A, and/or the second client 135B consistent with some implementations of the current subject matter. Referring to FIGS. 1-3 and 4A, the process 400 can be performed by the distributed data storage system 100, for example, by the one or more connection handlers 180. In some implementations of the current subject matter, the process 400 can be performed in order to deliver a message from the first client 135A to the backend server 130 and/or the second client 135B. However, it should be appreciated that the process 400 can be performed to deliver messages between any endpoints.

The one or more connection handlers 180 can receive a first message from the backend server 130 and/or the first client 135A (402). In some implementations of the current subject matter, the backend server 130, the first client 135A, and/or the second client 135B can be part of the Internet-of-Things. For example, the backend server 130 can coordinate the operations of the first client 135A and/or the second client 135B. Accordingly, the backend server 130, the first client 135A, and/or the second client 135B can generate data that is consumed by one another. For instance, the backend server 130 and/or the first client 135A can generate data consumed by the second client 135B. As noted, in some implementations of the current subject matter, the distributed data storage system 100 can serve as message oriented middleware (MOM) for brokering the exchange of data between the backend server 130, the first client 135A, and/or the second client 135B.

The one or more connection handlers 180 can respond to the receipt of the first message by at least appending the first message to a message queue having a same topic as the first message (404). In some implementations of the current subject matter, the one or more connection handlers 180 can route data between the backend server 130, the first client 135A, and/or the second client 135B based at least on the topics of the messages being exchanged. Accordingly, upon receiving a message from the first client 135A, the one or more connection handlers 180 can post that message to a message queue based on the topic of the message. For example, the one or more connection handlers 180 can post the message to a message queue having a same topic as the message. It should be appreciated that the message can be posted to a low traffic message queue belonging to, for example, another client such as the second client 135B. Alternatively and/or additionally, the message can be posted to a high traffic message queue belonging to, for example, the backend server 130.

According to some implementations of the current subject matter, a low traffic message queue that receives relatively few messages can be stored as a key-value pair in a key-value store. For example, the message queue for the first client 135A can be stored as the first key-value pair 160 in the first key-value store 115A and the message queue for the second client 135B can be stored as the second key-value pair 170 in the first key-value store 115A. Meanwhile, a high traffic message queue receiving a relatively large quantity of messages such as, for example, the message queue for the backend serve 130, can be stored as logs. Alternatively and/or additionally, each individual message in the high traffic message queue can be stored as a separate key-value pair instead of the entire message queue being stored as a single key-value pair, as is the case with low traffic message queues.

The one or more connection handlers 180 can send the first message and/or a second message from the message queue to the second client 135B based at least on the second client 135B having subscribed to the topic of the message queue (406). In some implementations of the current subject matter, to receive a message under a topic can require a subscription to that particular topic. As such, the one or more connection handlers 180 can send messages from the message queue to the second client 135B if the second client 135B has subscribed to the topic of the message queue.

For example, in some implementations of the current subject matter, the one or more connection handlers 180 can send, to the second client 135B, one or more messages from the message queue when the second client 135B is connected to the one or more connection handlers 180. It should be appreciated that the one or more connection handlers 180 may wait to send the messages to the second client 135B until the second client 135B is connected to the one or more connection handlers 180. Upon determining that the second client 135B is connected to the one or more connection handlers 180, the one or more connection handlers 180 may push messages in the message queue to the second client 135B. The one or more connection handlers 180 may further wait for the second client 135B to confirm that the second client 135B has successfully processed the messages from the message queue before the one or more connection handlers 180 removes the messages from the message queue.

Figure 4B:
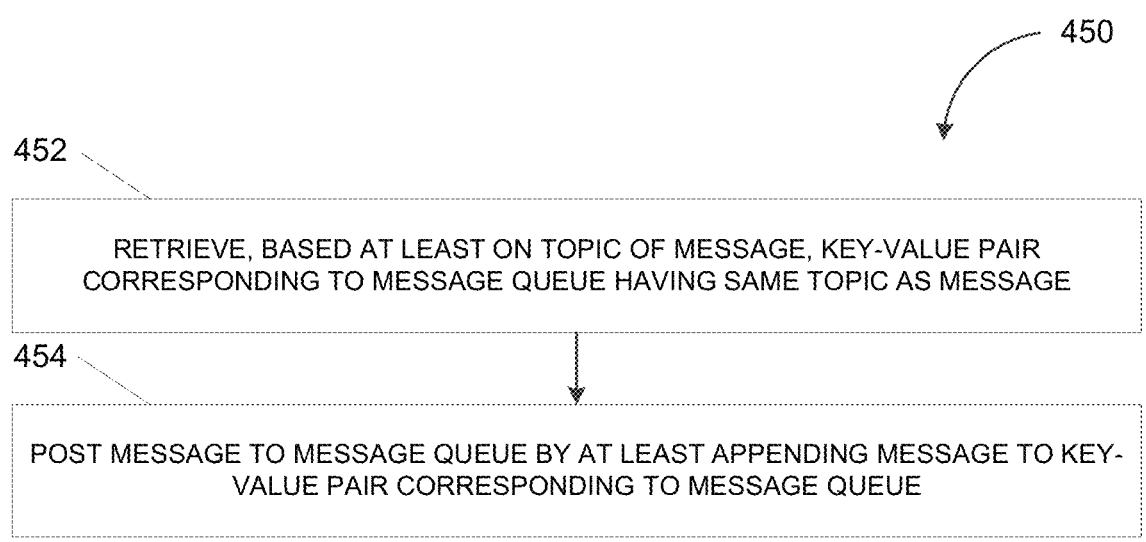
FIG. 4B depicts a flowchart illustrating a process for appending a message to a message queue consistent with some implementations of the current subject matter.

FIG. 4B depicts a flowchart illustrating a process 450 for posting a message to a message queue consistent with some implementations of the current subject matter. Referring to FIGS. 1-3 and 4A-B, the process 450 can be performed by the distributed data storage system 100, for example, by the one or more connection handlers 180. In some implementations of the current subject matter, the process 450 can implement operation 404 of the process 400 described with respect to FIG. 4A. For instance, the process 450 can be performed in order to append a message to the message queue of the second client 135B and/or any other low traffic message queue receiving relatively few messages. As such, the process 450 can be performed in order to append a message to a message queue that is stored as a key-value pair such as, for example, the message queue of the second client 135B, which can be stored as the second key-value pair 170 in the first key-value store 115A.

The one or more connection handlers 180 can retrieve, based at least on a topic of a message, a key-value pair corresponding to a message queue having a same topic as the message (452). For example, the message queue corresponding to the second key-value pair 170 can be associated with a topic. As such, the second key 172 of the second key-value pair 170 can correspond to the topic. In some implementations of the current subject matter, the second key-value pair 172 can be retrieved, for example, from the first key-value store 115A, based at least on the second key 172 matching the topic of the message.

The one or more connection handlers 180 can post the message to the message queue by at least appending the message to the key-value pair corresponding to the message queue (454). In some implementations of the current subject matter, the second value 174 of the second key-value pair 170 can correspond to the messages posted to the message queue. Accordingly, the one or more connection handlers 180 can post messages to the message queue at least by appending the messages to the second value 174 of the second key-value pair 170.

Figure 5:
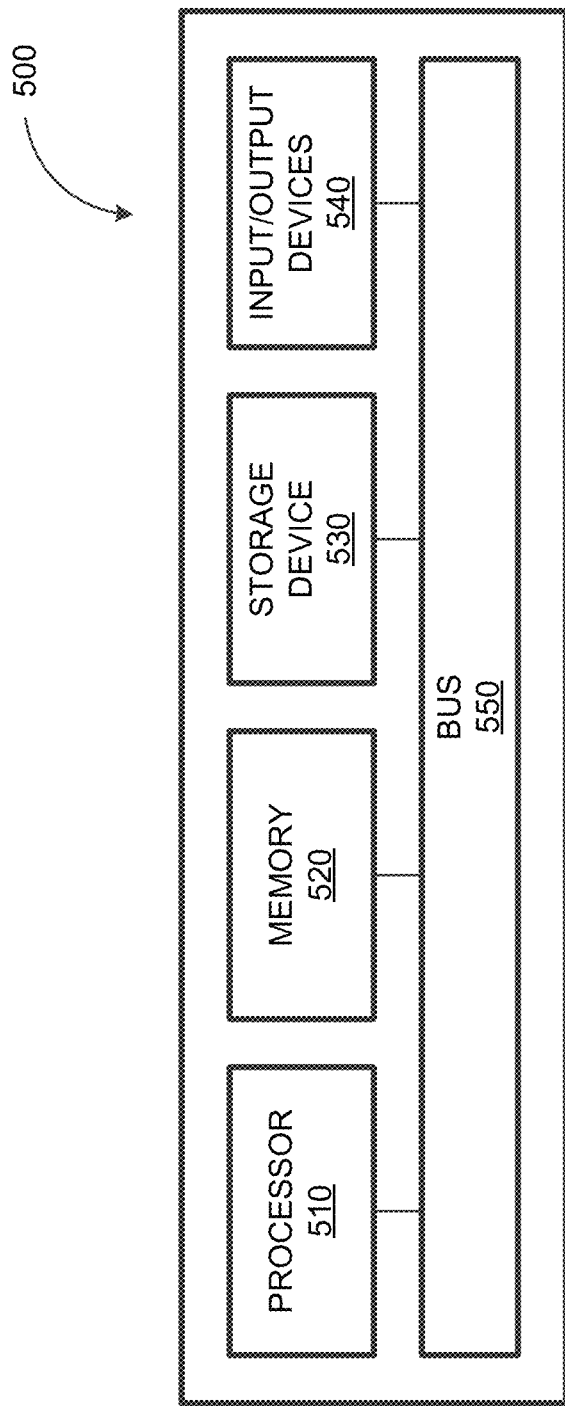
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1-2 and 5, the computing system 500 can be used to implement the distributed data storage system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
at least one data processor; and
at least one memory storing instructions which, when executed by the at least one data processor, cause operations comprising:
receiving, from a backend server and/or a first client coupled with the backend server, a message;
responding to the receipt of the message by at least posting the message to a message queue having a same topic as the message, the message being posted to the message queue based at least on a topic of the message matching a key of a key-value pair corresponding to the message queue, the message being posted to the message queue at least by appending the message to a value of the key-value pair corresponding to the message queue, the key-value pair stored in a hybrid key-value store in the distributed data storage system, the hybrid-key value store including an in-memory key-value store and a secondary data store, the message being appended to a first portion of the value stored in the in-memory key-value store in response to the first portion of the value including the message not exceeding a threshold size, and the message being appended to a second portion of the value stored in the secondary data store in response to the first portion of the value including the message exceeding the threshold size; and sending, to a second client coupled with the backend server, the message from the message queue based at least on the second client having subscribed to the topic of the message queue.

2. The system of claim 1, wherein the message is sent to the second client by a connection handler coupled with the backend server, the first client, and/or the second client, and wherein the connection handler is configured to push the message from the message queue to the second client.

3. The system of claim 1, wherein the key of the key-value pair corresponds to a topic of the message queue.

4. The system of claim 1, wherein the message queue is stored in a first data partition within the distributed data storage system, wherein the first data partition is stored at a first computing node comprising the distributed data storage system, and wherein a replica of the first data partition is stored at a second computing node comprising the distributed data storage system.

5. The system of claim 4, wherein the hybrid key-value store is stored at the first computing node, and wherein a replica of the hybrid key-value store is stored at the second computing node.

6. The system of claim 5, wherein the message queue is stored as a data record in the hybrid key-value store.

7. The system of claim 1, wherein the message queue is stored as the key-value pair based at least on a fewer than a threshold quantity of messages being posted to the message queue.

8. The system of claim 1, wherein the message queue is stored as a log and/or a plurality of key-value pairs that each correspond to a message posted to the message queue based at least on a greater than the threshold quantity of messages being posted to the message queue.

9. The system of claim 1, wherein the backend server, the first client, and/or the second client comprises an Internet-of-Things (IoT) system, and wherein the backend server is configured to coordinate an operation of the first client and/or the second client.

10. A computer-implemented method, comprising:
receiving, from a backend server and/or a first client coupled with the backend server, a message;
responding to the receipt of the message by at least posting the message to a message queue having a same topic as the message, the message being posted to the message queue based at least on a topic of the message matching a key of a key-value pair corresponding to the message queue, the message being posted to the message queue at least by appending the message to a value of the key-value pair corresponding to the message queue, the key-value pair stored in a hybrid key-value store in a distributed data storage system, the hybrid-key value store including an in-memory key-value store and a secondary data store, the message being appended to a first portion of the value stored in the in-memory key-value store in response to the first portion of the value including the message not exceeding a threshold size, and the message being appended to a second portion of the value stored in the secondary data store in response to the first portion of the value including the message exceeding the threshold size; and
sending, to a second client coupled with the backend server, the message from the first message queue based at least on the second client having subscribed to the topic of the first message queue.

11. The method of claim 10, wherein the message is sent to the second client by a connection handler coupled with the backend server, the first client, and/or the second client, and wherein the connection handler is configured to push the message from the message queue to the second client.

12. The method of claim 10, wherein the key of the key-value pair corresponds to a topic of the message queue.

13. The method of claim 10, wherein the message queue is stored in a first data partition within the distributed data storage system, wherein the first data partition is stored at a first computing node comprising the distributed data storage system, and wherein a replica of the first data partition is stored at a second computing node comprising the distributed data storage system.

14. The method of claim 13, wherein the hybrid key-value store is stored at the first computing node, and wherein a replica of the hybrid key-value store is stored at the second computing node.

15. The method of claim 14, wherein the message queue is stored as a data record in the hybrid key-value store.

16. The method of claim 10, wherein the message queue is stored as the key-value pair based at least on a fewer than a threshold quantity of messages being posted to the message queue.

17. The method of claim 10, wherein the message queue is stored as a log and/or a plurality of key-value pairs that each correspond to a message posted to the message queue based at least on a greater than the threshold quantity of messages being posted to the message queue.

18. A non-transitory computer readable medium storing instructions, which when executed by at least one data processor, cause operations comprising:
receiving, from a backend server and/or a first client coupled with the backend server, a message;
responding to the receipt of the message by at least posting the message to a message queue having a same topic as the message, the message being posted to the message queue based at least on a topic of the message matching a key of a key-value pair corresponding to the message queue, the message being posted to the message queue at least by appending the message to a value of the key-value pair corresponding to the message queue, the key-value pair stored in a hybrid key-value store in a distributed data storage system, the hybrid-key value store including an in-memory key-value store and a secondary data store, the message being appended to a first portion of the value stored in the in-memory key-value store in response to the first portion of the value including the message not exceeding a threshold size, and the message being appended to a second portion of the value stored in the secondary data store in response to the first portion of the value including the message exceeding the threshold size; and
sending, to a second client coupled with the backend server, the message from the first message queue based at least on the second client having subscribed to the topic of the first message queue.

* * * * *